United States Patent

[11] 3,612,956

| [72] | Inventors | Henley Frank Sterling<br>Hudson, Ware;<br>John Henry Alexander, Bishop's Stortford;<br>Denis William John Hazelden, Bishop's Stortford, all of England |
|---|---|---|
| [21] | Appl. No. | 33,408 |
| [22] | Filed | Apr. 30, 1970 |
| [45] | Patented | Oct. 12, 1971 |
| [73] | Assignee | International Standard Electric Corporation<br>New York, N.Y. |
| [32] | Priority | May 29, 1969 |
| [33] | | Great Britain |
| [31] | | 27163/69 |

[54] COMPOSITE DIELECTRIC ELECTROLYTIC CAPACITOR
10 Claims, 2 Drawing Figs.

[52] U.S. Cl. .................................................. 317/230, 29/570
[51] Int. Cl. .................................................. H01g 9/00
[50] Field of Search ........................................... 317/230, 231, 233, 258, 101; 29/570

[56] References Cited
UNITED STATES PATENTS

| 2,037,848 | 4/1936 | Brennan ........................ | 317/230 |
| 3,256,468 | 6/1966 | Jenney et al. .................. | 317/230 |
| 3,320,484 | 5/1967 | Riley et al. .................... | 317/101 |

Primary Examiner—James D. Kallam
Attorneys—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

ABSTRACT: An electrolytic capacitor structure and a method for making such a capacitor wherein a composite dielectric is utilized so as to obtain the benefits of a high dielectric constant and the "self-healing" properties of an electrolytic capacitor. An aluminum anode is coated with a dielectric layer of titanium dioxide. The coated aluminum anode is then inserted into an electrolyte so as to anodize any portions of the aluminum remaining exposed after coating with the titanium dioxide due to defects in the coating.

3,612,956

Inventors
HENLEY F. STERLING
JOHN H. ALEXANDER
DENIS W. J. HAZELDEN
By Herbert Stern
Attorney

COMPOSITE DIELECTRIC ELECTROLYTIC CAPACITOR

BACKGROUND OF THE INVENTION

This invention relates to electrolytic capacitors and more particularly to such a capacitor having a composite dielectric.

Since the capacitance of any form of capacitor is directly proportional to the dielectric constant of the dielectric between its electrodes and is inversely proportional to the thickness of that dielectric, it is desirable, when attempting to produce a compact device, to employ as the dielectric as thin a layer as possible of a material having as high a dielectric constant as possible. However, a limit will be set by the breakdown of the dielectric, its dielectric loss, and its current incurred under operating conditions. The breakdown voltage of a particular dielectric layer depends in part upon the intrinsic dielectric strength of the material and also in part upon the quality of the layer in terms of its freedom from impurities and defects such as pinholes, pores, occlusions, cracks, or the like.

In determining the minimum thickness of a dielectric layer of a particular composition which can be employed to fabricate a capacitor having a particular working voltage is very often found that the limiting factor is provided by the quality with which such layers can be produced. Thus, a particularly compact form of capacitor is provided by the conventional electrolytic capacitor which is made by the anodization of a foil of a so-called "valve" metal, such as aluminum, in a suitable electrolyte.

For the purposes of this specification the anode of an electrolytic capacitor is defined to mean that electrode of the capacitor upon which is deposited the dielectric layer, and the term anodization is defined to mean any electrolytic process for creating by chemical reaction and ion migration a dielectric film adhering to the anode. With this type of capacitor the thin dielectric film produced over the surface of the foil by the anodization acts as the dielectric of the capacitor. One electrode is formed by the foil while the other electrode is provided by the electrolyte to which electrical connection is made by the immersion of a second electrode, the counterelectrode or cathode.

In a conventional electrolytic capacitor employing an aluminum anode the cathode is also made of aluminum. If the capacitor is to be encapsulated, the liquid electrolyte is absorbed into an absorbent spacer, for example, a special form of paper. The precise composition of the electrolyte depends upon the design requirements and may be different from that originally employed to create the anodized film upon the surface of the anode.

The compactness of this type of capacitor is directly attributable to the fact that the thin films produced by the anodization can support relatively large working voltages. Thus, a conventional aluminum electrolytic capacitor formed at a tension of 50 volts has a dielectric layer of aluminum oxide of the order of only 700 Angstrom units thickness, whereas a nonelectrolytic capacitor consisting only of a dielectric sheet whose major surfaces are in contact with two metal plate electrodes and having a dielectric only 700 Angstrom units thick would be too thin to be practical, partly because of the difficulties of handling such an item, but more essentially because known methods of producing films of this thickness result in a product having too poor a surface finish and too many pinholes. These defects would serve to reduce the breakdown voltage to a level well beneath the theoretically achievable value based on measurements on bulk material of the dielectric strength of the dielectric. Similar defects are present in films produced by anodization, but such films closely follow the contours of their underlying anodes and any mechanical or electrical damage giving rise to defects in the continuity of the film results in the exposure of the underlying anode to the electrolyte thereby causing fresh anodization to occur in the locality of these defects so that the capacitor can be said to be "self-healing" in operation.

Hitherto known structures of electrolytic capacitors have employed dielectrics which have been formed exclusively by the anodization of their anodes. This places a restriction on the value of the dielectric constant which can be chosen for use with a particular anode material. For example, aluminum is commercially and technologically favorable as an anode material for electrolytic capacitors, but the dielectric constant of the dielectric layer formed by the anodization of an aluminum anode does not have as large a dielectric constant as that of a layer formed by the anodization of a tantalum anode. Tantalum, however, is a rare element and significantly more costly than aluminum.

A high dielectric constant insulator such as tantalum dioxide, or preferably, on account of its greater dielectric constant, titanium dioxide, can be deposited on aluminum from the vapor phase by one of the known methods of vapor deposition, and such a coating could be overlaid with a metal layer to provide a counterelectrode so that the whole article forms a nonpolar capacitor with a high dielectric constant dielectric. The dielectric constant for titanium dioxide deposited in this manner may range between 50 and 100, the value depending on a number of factors including its structure and stochiometry as determined by the method and conditions of deposition. Since such a capacitor would be nonelectrolytic, it would not have the "self-healing" properties referred to above. Hence, the dielectric must be sturdy enough to enable it to withstand normal handling processes that occur in manufacture, such as rolling, and this will require a thickness more than an order of magnitude larger than the dielectric of a comparable electrolytic capacitor. Moreover, it is generally found that capacitors made from high dielectric constant materials such as titanium dioxide have less favorable power factors as compared with the low loss capacitors of the mica and polystyrene group. It is seen, therefore, that such a form of capacitor, in spite of its large dielectric constant, has little, if any, advantage over the conventional aluminum electrolytic capacitor because its power factor is not much better, and the benefit of its larger dielectric constant is offset by its extra thickness.

SUMMARY OF THE INVENTION

Therefore, the main object of this invention is to provide an electrolytic capacitor having a composite dielectric which has the benefits of both a high dielectric constant and the "self-healing" properties of an electrolytic capacitor.

A feature of this invention is to provide an electrolytic capacitor wherein a number of different dielectric materials may be used in conjunction with a particular anode material.

According to the present invention, there is provided an electrolytic capacitor comprising an anode formed of a first metal, a dielectric layer formed of a compound of a second metal coating said anode, said dielectric layer having at least one aperture extending through said coating, and an oxide of said first metal coating said first metal at said aperture.

According to the present invention, there is also provided a method of making such an electrolytic capacitor comprising the steps of coating the surface of a first metal with a layer of a dielectric material formed of a compound of a second metal, and inserting said coated first metal into an electrolyte so as to anodize any portions of said first metal which are exposed after the coating of said first metal with said compound of said second metal.

Further objects and features of this invention will become more apparent by reference to the following description taken in conjunction with the accompanying drawings in which:

DESCRIPTION OF THE PREFERRED EMBODIMENT

The following description relates to the manufacture of a composite electrolytic capacitor having a dielectric whose major constituent is titanium dioxide and whose minor constituent is aluminum oxide.

A strip of aluminum foil used to form the anode of the capacitor is first coated on both sides with a film of titanium dioxide to a depth of the order of 1,000 Angstrom units. A convenient method of deposition for this purpose is a vapor reaction process. Titanium dioxide is formed by a low temperature hydrolysis reaction in which water vapor is mixed with one of a variety of reagents such as titanium halide or an organic titanate such as an alkyl or alkoxyl derivative of titanium. If a halide is employed, the other product of the hydrolysis is the halogen acid which may be incorporated into the dielectric film. It is known that the presence of halogen ions can have a deleterious effect in aluminum capacitors over a period of service, so there can be an advantage gained from the use of an organic titanate. The compound employed in the present example is tetraisopropyl reorthotitanate, for which the other product of the reaction is isopropyl alcohol. The deposition process involves the mixing of two gas streams at the outlets of each of two nozzles, water vapor being entrained in one stream and tetraisopropyl orthotitanate in the other. The outlets are situated on either side of the foil and scanned from side to side while the foil is advanced between them. In this way a uniform film is deposited over the whole of both surfaces of the foil. The deposition process is controlled both by the concentration of the vapors in the two gas streams and by their rates of flow. The concentrations are determined by the vapor pressures of the reagents at the temperatures at which the carrier gases are bubbled through them, and a suitable rate of deposition is achieved by maintaining the tetraisopropyl orthotitanate at a temperature of about 90° C. and bubbling the argon through it at about 1.5 liters per minute, while a similar rate of flow is bubbled through the water which is maintained at 40° C. The thickness of the deposited layer is determined by this rate of deposition and by the rate at which the foil is fed between the nozzles. The required thickness is determined with reference to the working voltage and breakdown characteristics required of the film. Typically, a film of the order of 1,000 Angstrom units thick is suitable for a 50- volt working capacitor.

Figure 1:
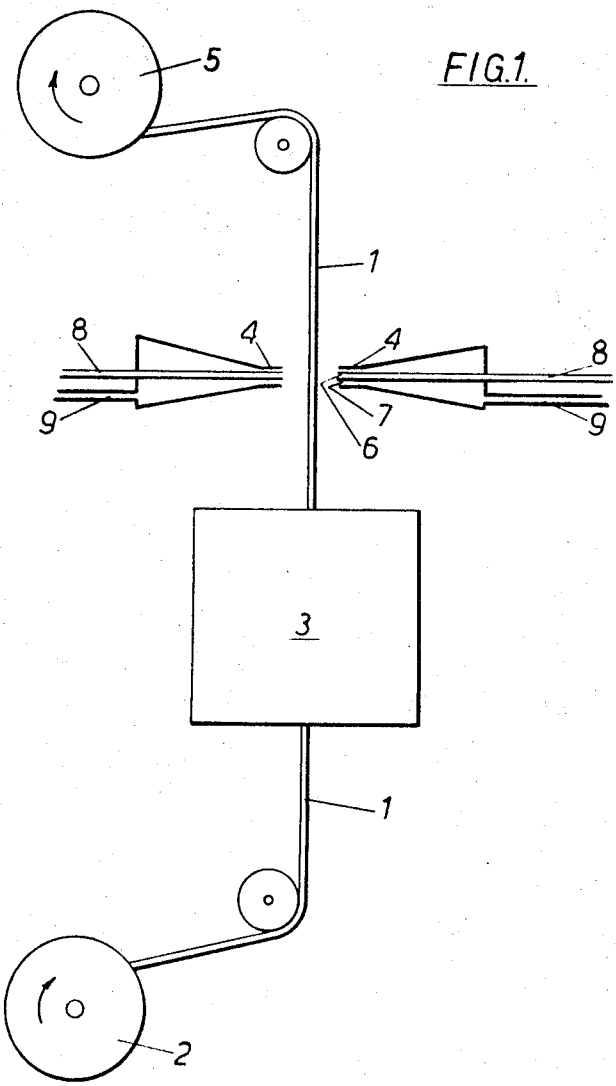
FIG. 1 is a diagram of apparatus for deposition by vapor reaction.

The process may be carried out by means of apparatus illustrated schematically in FIG. 1, in which a strip of foil 1 to be coated with titanium dioxide is unwound from a spool 2. The foil passes upward through a furnace 3 maintained at 300° C. and then between two opposed nozzles 4 held about 3 cm. apart before being rewound on a spool 5. Each of nozzles has two concentric orifices 6 and 7 which are connected to separate ducts 8 and 9 through which two different gas streams of argon can be passed so as to mix in the vicinity of the nozzles' outlet. One of these gas streams is arranged to contain a small proportion of water vapor while the other contains a small proportion of tetraisopropyl orthotitanate vapor. These vapors are diffused in the argon by bubbling argon through doubly de-ionized water and tetraisopropyl orthotitanate respectively. In the case of the gas stream bubbled through the titanate, the gas stream is first dried so that no hydrolysis can occur before the meeting of the two different gas streams.

The required thickness of the film of titanium dioxide coating the foil is so thin that it contains a number of defects at which the underlying metal is exposed. Unless these defects are in some way repaired they would provide sites at which premature breakdown of the capacitor would occur. The method of repairing these defects provided by the invention is to fill the sites of the defects with anodized material derived from the underlying anode. However, before anodizing the foil it is preferred to subject the foil to some form of heat treatment. This heat treatment serves to improve the dielectric characteristics of the film, increasing its dielectric constant and reducing its power factor, and this is probably attributable to the heating inducing a structural change and assisting the eliminating of unwanted volatile chemicals from within the film. The heat treatment may consist of heating the foil for 1 hour at 200° C., but it will be realized that these particular parameters are not critical so that the same effect could be alternatively achieved by heating the foil to a higher temperature for a shorter period.

Next the foil is immersed in a suitable electrolyte for anodization, such as a 3 percent aqueous solution of ammonium citrate. It will be appreciated that only a very small fraction of the total surface area of the aluminum foil is not already covered by the insulating film of titanium dioxide so that anodization will only proceed at points where there are defects in the film which expose the underlying metal. Consequently the current flowing in the electrolytic circuit has to be carefully limited to an extremely small value, which may typically be of the order of a microamp, in order that the current density at these defects shall not greatly exceed the normal current density employed in the manufacture of conventional aluminum electrolytic capacitors. If the applied voltage is not adequately controlled and the current density grossly exceeds the proper value there will be local heating at the defects which will have a disruptive effect rather than a healing one. As with the anodization of a conventional aluminum electrolytic capacitor, the anodization process is continued until the current has dropped significantly and remains steady with an applied voltage equal to the desired working voltage of the completed device.

Next the foil is removed from the electrolyte, washed, and subjected to a heat treatment similar to that previously provided. This heat treatment, like the previous heat treatment, is not an essential step but merely serves to improve the power factor obtained with the completed capacitor.

Figure 2:
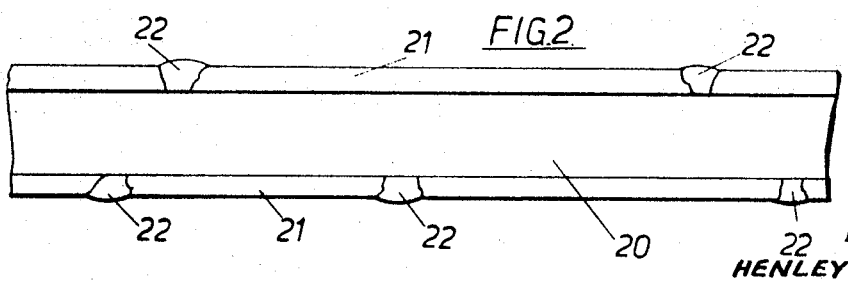
FIG. 2 is a cross-sectioned view of the anode of the capacitor before rolling.

The coated foil which is illustrated schematically in cross section in FIG. 2 is now ready for cutting up into appropriate lengths to form the dielectric coated anodes of capacitors. The aluminum foil 20 has a coating of titanium dioxide 21. Defects in the titanium dioxide which before anodization expose the underlying metal, are now filled with aluminum oxide 22 derived from the foil during the anodization process.

The final stages in the manufacture of the capacitor, namely, the sandwiching of the coated foil between porous paper spacers filled with electrolyte, the provision of an aluminum counter electrode, the rolling up of the completed sandwich and the subsequent encapsulation in a can are performed in the same way as the corresponding stages in the manufacture of a conventional aluminum electrolytic capacitor. It is, of course, necessary to ensure that the working electrolyte chosen is one which is of a type based on ethylene glycol and boric acid which is suitable for conventional aluminum electrolytic capacitors and which also does not react with titanium dioxide.

In view of the fact that with the layer of titanium dioxide coating the anode very little anodization is required, it is possible to eliminate the stage of manufacture described above in which the coated foil is initially anodized in an electrolyte prior to its being brought into contact with its working electrolyte. In a conventional aluminum electrolytic capacitor this initial anodization has to be performed as a separate step before encapsulation for a number of reasons including the fact that a substantial quantity of gas is evolved during this step and also because the material produced by this anodization forms the main dielectric of the capacitor and consequently should have its dielectric properties optimized by a forming stage. In contrast to this, in the instant invention, the heat treatment of the titanium dioxide coated foil after anodization is not an essential step because any improvement of the dielectric qualities of the anodized material engendered thereby will have only a marginal effect on the overall characteristics of the capacitor in view of the fact that the anodized material represents a very small fraction of the total dielectric. Therefore, after the foil has been coated with titanium dioxide it is possible to proceed either directly or via the single stage of heat treatment, to the stage of manufacture in which the foil is sandwiched between porous paper spacers filled with the final working electrolyte.

While the above description has related to the manufacture of capacitors having anodes which have been coated with titanium dioxide by a vapor reaction process, it should be understood that the invention is not limited in its application solely to this particular method of vapor deposition nor even solely to the material titanium dioxide.

The vapor reaction process described above results in the deposition of one of the insulating forms of titanium dioxide which is white in color and is generally designated $TiO_2$. It is, however, possible to vary the conditions of deposition so that slight chemical reduction of the $TiO_2$ takes place and a form of $TiO_2$ is deposited which is brown or black in color due to slight oxygen deficiency. This form may be designated $TiO_{1.95}$, or perhaps more accurately $TiO_x$, and is well known as a lossy dielectric having resistive or semiconducting properties. A lossy dielectric film of this type may be anodized in, for example, a solution of ammonium tartrate to give the fully oxidized form of $TiO_2$. It has been found that the deposition of $TiO_x$ is beneficial in the manufacture of capacitors described herein inasmuch as an improvement in properties of the finished capacitor is obtained, probably due to a more even field distribution when pinholes are being filled with aluminum oxide. The use of this technique would apply also to other oxide and dielectric materials which can be chemically somewhat reduced to a partially conducting form and subsequently anodized to regain the fully oxidized and insulating condition.

Examples of materials having large dielectric constants which might be usefully employed in place of titanium dioxide are, vanadium oxide, niobium oxide or barium, strontium or calcium titanates.

It is to be understood that the foregoing description of this invention is made by way of example only and is not to be considered as a limitation on its scope.

We claim:

1. An electrolytic capacitor comprising:
   an anode formed of a first metal;
   a dielectric layer formed of a compound of a second metal coating said anode, said dielectric layer having at least one aperture extending through said coating; and
   an oxide of said first metal coating said first metal at said aperture.

2. An electrolytic capacitor, according to claim 1, wherein said first metal is aluminum.

3. An electrolytic capacitor, according to claim 1, wherein said compound of a second metal is titanium dioxide.

4. A method of making an electrolytic capacitor comprising the steps of:
   forming an anode from a first metal, coating the surface of said first metal with a layer of a dielectric material formed of a compound of a second metal; and
   inserting said coated first metal into an electrolyte and anodizing the portions of said first metal which are exposed after the coating of said first metal with said compound of said second metal.

5. A method of making an electrolytic capacitor, according to claim 4, wherein said dielectric material is a lossy dielectric whose dielectric properties are strengthened by anodization.

6. A method of making an electrolytic capacitor, according to claim 4, wherein said first metal is aluminum.

7. A method of making an electrolytic capacitor, according to claim 4, wherein said compound of said second metal is titanium dioxide.

8. A method of making an electrolytic capacitor, according to claim 4, wherein said step of coating comprises the step of vapor depositing said dielectric material.

9. A method of making an electrolytic capacitor, according to claim 4, further comprising the step of baking the coated first metal prior to inserting said coated first metal into said electrolyte.

10. A method of making an electrolytic capacitor, according to claim 4, further comprising the step of baking said coated and anodized first metal.